United States Patent Office 3,188,783
Patented June 15, 1965

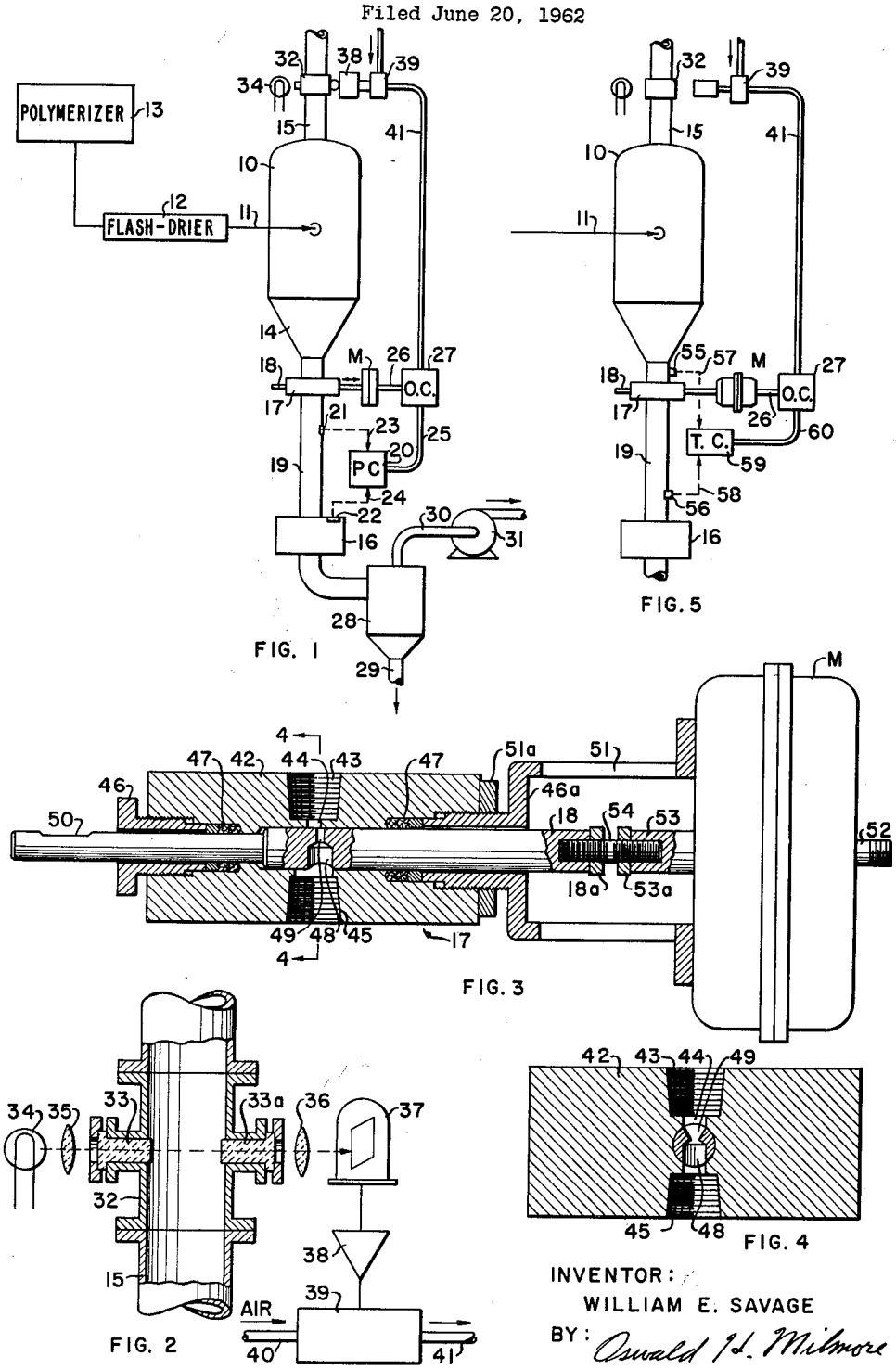

3,188,783
DISCHARGING POWDER FROM HIGH-PRESSURE VESSELS
William E. Savage, Castro Valley, Calif., assignor to Shell Oil Company, New York, N.Y., a corporation of Delaware
Filed June 20, 1962, Ser. No. 203,976
8 Claims. (Cl. 55—20)

The invention relates to the continuous discharge of pulverulent material from a pressurized zone which contains said material and a gas, and is directed to control of a slit-shaped passage through which the said solid material is discharged together with only a restricted quantity of gas. The invention is useful, for example, for recovering powder from a vapor stream with only a minimal escape of gas from the high-pressure zone, which may be a closed vessel or a flow line but will be herein exemplified as a separator wherein the powder is concentrated.

There is frequent need in industry to separate small solids from a high-pressure gas without depressurizing a significant or an excessive quantity of the gas. This need arises, for example, in chemical processes wherein the gas is a vaporized solvent which must be recycled at elevated pressure to a polymerization or reaction zone. "High-pressure letdown" describes the recovery of powder from a high-pressure gas with a minimal escape of gas with the powder from the high-pressure zone. The latter zone may contain the solids substantially dispersed in the gas but more usually is a unit which concentrates the solids, as in the case of a cyclone or filter chamber.

Various high-pressure letdown systems are known. Lock-type devices—among which are star valves and rotary or linearly reciprocating valves which provide pockets placed into communication alternately with the feed and discharge passages—are subject to rapid wear, especially with some types of solids, leading to excessively high gas leakages or blow-by when operated at high pressure differences between their feed and discharge sides. Another known system is the "blow-case," in which a pressure vessel is fitted with inlet and discharge valves at the top and bottom, respectively, and said valves are operated sequentially, whereby the vessel acts as a lock. The weak point is again leakage and wear in the valves and the intermittent nature of their operation, which makes it necessary to provide blow-cases in pairs so that by alternating their intake cycles the source vessel or cyclone need not provide powder storage during the discharge cycle of the blow-case.

It is also known to use as continuous-flow letdown devices various throttling valves, such as guillotine and adjustable iris types, which provide more or less square or circular orifices, and needle and sphincter types, which provide annular or linear slits of variable widths. Such valves are suitable for passing minimal amounts of gas at high pressure differences only when the slit length is correct for the total rate of solids to be passed. According to a construction claimed and further described in my copending application Ser. No. 203,975 filed concurrently herewith, the length of the slit can be varied to adapt it to the total rate of solids flow.

Known control devices for varying the width of slit-type high-pressure letdown valves have been deficient in that they did not attain the optimum or a steady, desired gas-to-solids ratio in the effluent discharged through the slit. Although the gas-to-solids ratio in the effluent is lowest when the valve slit is so small that incipient bridging of the solids at the entrance to the passage occurs, these known systems usually caused far greater widths to occur. For example, it is common to operate the valve continually, often at a frequency of 10 to 60 cycles per minute, to vary the passage, usually between positions in which that passage is too large and too small.

As was shown in the aforesaid copending application, improved control of the gas-to-solids ratio and lower ratios are attained when the valve passage is not subjected to rapid and large variations, but is adjusted slowly or in small steps. This method of control is founded on the concept that the ratio of gas to solids in the issuing stream is dependent upon the slit width, particularly at high gas velocities which, in the preferred mode of operation, are sonic or near sonic. Sonic velocities occur when the pressure drop across the slit exceeds the critical pressure ratio. Under these conditions the solids within the slit, which are moving more slowly, impose very large interference wiht the flow of gas by reducing the open area of the slit available for gas flow. The solid particles are slowed down by mutual interference and by friction with the walls of the slit. By maintaining the slit width at or close to the minimum required to pass the solids and by using a slit which is substantially uniform in width throughout its length, an improved control of the gas-to-solids ratio can be effected by small variations in the slit width.

Preferably the letdown valve is constructed to permit the length of the slit to be altered, either occasionally or continually during operation, to adapt its solids-handling capacity to the average or intended solids flow rate, as further described in the aforesaid application. However, the instant invention is not restricted to that type of valve but may be used in connection with known types of valves having orifices of fixed lengths; these are suitable when the length is correct for the prevailing solids flow rate and/or when a variable number of such fixed-lengths orifice valves is brought into operation as the solids flow rate varies.

In the above-described control of the slit width the valve is provided with a motor or valve actuator which varies the slit in response to a measurement on a thermodynamic property of the effluent mixture, i.e., a property related to the pressure change (which indicates the gas flow rate) or the temperature change on passage through the slit (which indicates the gas-to-solids ratio) to maintain that flow or ratio constant. This control is usually satisfactory in the range of slit widths greater than optimum but can fail, especially when the slit width is too small, due to adventitious bridging by the solid particles at the slit entrance. When this occurs only gas flows through the slit, leading to increasing gas-to-solid ratios; however, the measuring device may in some situations operate to transmit a signal which tends to narrow the slit, thereby aggravating the blockage of solids.

It is the object of the invention to provide a method and apparatus for counteracting the action of the control system in the event that bridging occurs.

In summary, according to the invention a letdown system of the type described, which includes a letdown valve having a slit-shaped passage which is adjusted automatically by a measurement of a thermodynamic property of the stream flowed through said passage, is provided with an overriding controller which widens the slit when solids occur in the clean gas which flows out of the high-pressure chamber.

The overriding controller may, according to a practical embodiment, be constructed to respond to a powder detector, such as an optical cell a photocell detector, mounted at a sight glass in the clean-gas discharge line or a gamma-ray detector similarly placed, which emits a signal whenever solids occur in the clean gas stream (i.e., whenever any are detected or when detected in amount greater than a predetermined level). Upon receipt of such a signal the overriding controller rapidly widens the slit by a predetermined amount, either in one or in a series of steps. When solids are no longer detected the signal ceases and the valve actuator is again placed under control of the downstream measuring device.

The invention will be further described with reference to the accompanying drawings forming a part of this specification and showing certain preferred embodiments by way of illustration, wherein:

FIGURE 1 is a diagrammatic view of a letdown system to which the invention is applied;

FIGURE 2 is a sectional view of a part of the optical solids detector;

FIGURE 3 is a longitudinal sectional view of a preferred form of letdown valve;

FIGURE 4 is a transverse sectional view taken on the line 4—4 of FIGURE 3; and

FIGURE 5 is a diagrammatic view of a letdown system showing a modified control for the slit width.

Referring to FIGURE 1, the high-pressure zone is embodied by a cyclone separator 10 to which a suspension of pulverulent solids in a gas at elevated pressure is admitted tangentially from a line 11. This may for example, be a suspension of solid particles of polypropylene in vaporized hydrocarbon solvent, such as propylene monomer and butane, having a pressure of 100 to 400 lbs. per sq in., produced by vaporizing the solvent in a flash-drier 12 from a slurry produced in a polymerizing unit 13. The solids settle in the conical bottom 14 of the cyclone and are thereby concentrated, and the clean gas flows out at the top through a central pipe 15. It is desired to recover the clean gas at elevated pressure, to permit recycling to the unit 13 after condensation, and to discharge the separated solids from the cyclone to a low pressure zone, such as a receiving chamber 16 which may, for example, be at atmospheric pressure or at some other pressure, which may be held constant by suitable means, not shown. Usually the ratio of the pressures exceeds the critical pressure ratio. Further, it is desired to flow only a small quantity of gas from the cyclone to the receiving chamber. In this embodiment it is assumed that it is desired to flow gas through the valve at a uniform rate.

The removal of solids from the cyclone is effected by discharge of the concentrated solids through the letdown valve 17, the said valve comprising a control spindle 18 which is axially movable to vary the width of a slit in the valve. Moreover, the spindle preferably can be rotated to adjust the slit length, as will appear. Reciprocating longitudinal motion is imparted to the spindle by an electric or pneumatic motor M. The solids issuing from the valve flow through a conduit 19 is measured by a pressure controller 20 which receives indications of the pressures at points spaced along the conduit, e.g., at an upstream point in the conduit and in the chamber 16, from pressure-sensitive cells 21 and 22 via lines 23 and 24, respectively. (When the chamber 16 is operated at a constant pressure the cell 22 and its control line 24 may be omitted.) The output from the controller 20 may be a pneumatic pressure which is transmitted via ducts 25 and 26 through the overriding controller 27 to control the motor M so as to increase or decrease the slit width to achieve the desired gas flow, that is, to attain that slit width at which the pressure difference between the elements 21 and 22 is a preselected value, which can be adjusted by varying the set point of the controller 20. In a specific embodiment the motor M acts to widen the slit as the pressure in the duct 26 rises.

The solids from the chamber 16 may be separated from the gas in a separator 28, e.g., a filter unit, from which solids are discharged at 29 to a subsequent processing unit, such as one wherein residual gas is purged from the solids. The gas discharged from the separator at 30 via duct 31 must, in many instances, be re-compressed to permit recycling, as to the polymerizing unit 13, in a compressor 31. Usually the compressor has a fixed maximum capacity, and the rate at which the gas escapes through the letdown valve 17 should not exceed the compressor capacity. The controller 20 prevents a gas escape rate which is gerater than the set point and thereby controls the gas-to-solids ratio. It may be noted that the low pressure within the chamber 16 need not be independently controlled, but may be determined by the compressor 31; in this event the set point of the controller should be somewhat lower than the compressor capacity to obviate a rise in the pressure in the chamber 16 which would spuriously indicate a fall in gas flow.

The clean gas from the pipe 15 is flowed through a solids detector of any suitable type, such as a photocell or a gamma-ray meter, for detecting presence of solids in the gas. The detector may, for example, comprise the parts shown in FIGURE 2. Thus, the pipe 15 has a housing 32 provided with a transverse bore within which are fitted transparent cylinders 33 and 33a, e.g., made of glass and preferably projecting into the flow channel as shown. This projection is desirable to prevent fogging of the exposed end surfaces of the cylinders 33 and 33a due to deposition of solids which would occur if they were recessed. A light source 34 emits a beam of light through a lens 35, the transparent cylinder 33 and 33a, and a second lens 36 onto a photo-cell 37 which is connected to an amplifier 38. The amplifier emits an electrical signal which is applied to an electrical-pneumatic transducer 39. The latter receives instrument air from a duct 40 and impresses on an output duct 41 a pneumatic pressure whenever the light acting on the photocell is diminished by the presence of solids, but impresses no signal (or only a low) pressure when no solids flow. This signal is transmitted to the overriding controller which may, for example, be a pneumatic adder for impressing on the control duct 26 a pneumatic pressure equal to the sum of the pressures in the ducts 25 and 41. Hence the pressure in the duct 26 is normally that in the duct 25; however, when a pressure appears in the duct 41 the pressure in the duct 26 rises sharply to cause the motor to widen the slit in the valve 17. When the pressure in the duct 41 ceases, normal operation under control of the controller 20 is resumed.

The function of the overriding controller 27 and the detector 32–39 are to guard against any abnormal functioning of the valve 17. Thus, it may happen that, for any reason, bridging occurs at the entrance to the slit in the valve 17, which filters out solids and permits only gas to flow. The stream in the conduit 19 now has a very high gas-to-solids ratio, and this ratio will not be decreased by further narrowing of the slit. Bridging may, for example, be initiated by a transitory increase in the particle size of the powder or its adhering properties. The consequence of such a condition is that the controller 20 is ineffective to re-establish the proper slit width and that solids are carried off with the clean gas through the pipe 15. When this condition arises the overriding controller 27 transmits a signal to open the slit and thereby purge the accumulated solids until the clean gas is free from solids.

It may be noted that the various measuring and controlling devices are well known per se and are, for this reason, not further described; and that the invention is not restricted to the use of a pneumatic control system; thus, the control system and/or the motor M may be eliectrical, pneumatic or mechanical.

FIGURES 3 and 4 show a simple embodiment of the letdown valve 17. It comprises a valve housing or body 42 formed with a horizontal bore of circular cross-section which contains the control spindle 18, and with a vertical passage comprising an internally threaded inlet 43, a slot-shaped passage 44 having sharp, parallel, arcuate edges intersecting the bore, and an internally threaded outlet 45. The ends of the bore are threaded to receive packing glands 46 and 46a by which packing 47 is pressed against the spindle to seal it. The spindle has a passage which includes a large, circular part 48 at the bottom and a slot-shaped part 49 at the top. The arcuate upper edges of the latter are also sharp and parallel to each other and to the said edges of the slot 44. As the spindle is shifted axially the width of the slit between the slots 44 and 49 is varied. As appears in FIGURE 4, the length of the slit, measured circumferentially with respect to the spindle 18, can be varied. The spindle has a flat area at 50 for receiving a wrench. Lock nut 51a secures gland 46a.

Formed on the gland 46a is a bonnet 51 to which the pneumatic motor M is fixed. The latter has a pneumatic coupler 52 for admitting operating air from the duct 25, drives an output stub shaft 53 axially toward the left, as viewed in FIGURE 3, as the applied pressure increases, and has a spring for retracting the shaft 53 toward the right as the pressure decreases. The stub shaft is rotationally connected to the spindle 18 by a screw 54.

In operation, movement of the spindle 18 toward the left widens the slit between the edges of the slots 44 and 49, thereby widening the slit. The length of the slit can be reduced by applying a wrench to the flat area 50 and rotating the spindle. The spindle retains in its angular adjustment due to the packing material 47, and no means for locking the spindle against rotation are always necessary. However, lock nuts 18a and 53a may be used to secure the spindle rotationally.

Referring to FIGURE 5, the system is like that of FIGURE 1 and like reference numbers denote like elements. The system differs in that the gas-to-solids ratio is measured by measuring the temperature reduction of the gas in flowing through the slit valve 17. To this end there are provided temperature-measuring devices 55 and 56, such as thermocouples, mounted to measure the gas temperature upstream and downstream from the valve and connected by lines 57 and 58 to a differential temperature controller 59. This controller is connected by a duct 60 to the overriding controller 27, as was previously described. The controller 59 is of the type that transmits via the duct 60 a pneumatic pressure signal which positions the spindle 18. The control is such that the slit width is increased when a change in width tends to lower the temperature difference between the devices 55 and 56. Controllers of this type are known per se. In one form, it emits internal electrical signals of either positive or negative polarity at intervals to position a pressure-regulating valve. It further includes a memory unit, such as a potentiometric null device, for comparing the temperature difference before and after a change in the pneumatic pressure. If the measured temperature difference decreases, another internal electrical signal of the same polarity is emitted to alter the output pressure in the same direction; if the temperature difference increases, an internal electrical signal of opposite polarity is emitted to change the pneumatic pressure in the opposite sense.

It is evident that the upstream device 55 and line 57 may be omitted when the temperature in the zone 10 does not vary suddenly; in that case the controller 69 operates to maintain the maximum temperature possible at the downstream device 56.

As was explained earlier, the gas is cooled by the Joule-Thomson effect in flowing through the slit in the valve 17, and this cooling effect becomes smaller as the quantity of solids flowing through the slit increases. Hence, by establishing and maintaining the smallest temperature differential (or the highest temperature at the downstream device 56 when only one is used) the effluent stream has the minimum gas-to-solids ratio. This is possible with the technique described because, as the slit width increases from its optimum for the minimal gas-to-solids ratio, the solids are less effective to obstruct the slit, causing a larger current of gas to flow through the slit; and during the initial decrease in slit width from the said optimum width, progressively more solids are hindered from passing, being retained at the slit entrance by bridging, while the gas continues to flow, encountering decreased resistance in the slit although increased resistance in flowing through the bridge. Of course, continued reduction in the slit width leads to reduced gas flow and could, in some instances, result in decrease in the Joule-Thomson temperature reduction; however, this occurs only with slit widths smaller than those which are encountered in the normal operation. Moreover, when the temperature of gas in the zone 10 is high—which would be true in the example given, wherein heat is applied in the drier 12—cessation of gas flow would lead to a fall in temperature at the cell 56. However, should the slit width for any reason be reduced so far as to cause operation under this undesirable condition, leading to bridging and accumulation of solids at the slit entrance, the overriding controller 27 acts to increase the slit width, as was described in connection with FIGURE 1.

I claim as my invention:

1. A high-pressure letdown method for discharging pulverulent solids from a high-pressure zone which contains said solids and gas into a low-pressure zone, said method comprising:
  (a) flowing said pulverulent solids and gas from said high-pressure zone into said low-pressure zone through a slit having a length longer than several times its width,
  (b) discharging gas from said high-pressure zone separately from said flow through the slit,
  (c) monitoring the gas discharged in (b) to detect the presence of solids therein and emitting an overriding signal when solids are detected therein, and
  (d) controlling the width of said slit between said zones by
    (1) measuring a thermodynamic property in said stream, said property being related to a pressure or temperature change in said stream transmitting a signal relative thereto,
    (2) adjusting the width of the slit responsively to said signal, and
    (3) increasing the width of said slit independent of said first signal in response to said overriding signal.

2. Method as defined in claim 1 wherein:
  (a) step (d)(1) includes measuring the change in rate of gas flow through the slit and
  (b) step (d)(2) includes adjusting the slit width to maintain a constant, predetermined rate of gas flow.

3. Method as defined in claim 1 wherein:
  (a) step (d)(1) includes measuring the temperature reduction of the gas flowing through the slit and
  (b) step (d)(2) includes adjusting the slit width to attain a minimum temperature reduction.

4. Method as defined in claim 1 wherein said high-pressure zone is a gas-solids separating zone and said solids are concentrated within said zone prior to discharge therefrom.

5. A high-pressure letdown system for discharging pulverulent solids and gas from a high-pressure zone which comprises:
  (a) a pressure vessel having an inlet for the admission of said gas and solids under pressure, a first outlet for solids and gas, and a second outlet for gas,
  (b) a letdown valve connected to said first outlet, said valve including a body providing a flow passage and control means for obstructing a part of said passage and leaving a slit-shaped area thereof unobstructed, said area having a length at least several times its width, said control means being movable relatively to said body to vary the width of said slit,
  (c) means for measuring a thermodynamic property of the stream of gas and solids discharged through said slit, said property being related to a pressure or temperature change in said stream, transmitting a signal relative thereto, (d) means for moving said control means in response to said signal and thereby vary the slit width,
(e) means for detecting the presence of solids in the gas discharged through said second outlet, and
(f) means responsive to the solids-detection means for overriding the means of (d) and increasing the slit width upon the detection of solids.

6. A system as defined in claim 5 wherein said pressure vessel is a cyclone, said first outlet being at the bottom thereof and the second outlet at the top.

7. A system as defined in claim 5 wherein the said means (c) includes means for measuring the change in rate at which gas flows through the valve.

8. A system as defined in claim 5 wherein the said means (c) includes means for measuring the drop in temperature of the gas during flow through the valve.

References Cited by the Examiner

UNITED STATES PATENTS

| | | | |
|---|---|---|---|
| 2,395,357 | 2/46 | Trawick | 55—217 |
| 2,491,445 | 12/49 | Cunningham et al. | 196—132 |
| 2,953,440 | 6/56 | Claudy | 137—487.5 |
| 2,984,988 | 5/61 | Berger et al. | 55—21 |
| 3,055,389 | 9/62 | Brunner | 137—487 |
| 3,080,876 | 3/63 | Adamson | 137—487.5 XR |

FOREIGN PATENTS 762,258  11/56  Great Britain.

REUBEN FRIEDMAN, *Primary Examiner.*